United States Patent
Stauss

(10) Patent No.: US 7,806,622 B2
(45) Date of Patent: Oct. 5, 2010

(54) TILTING CONNECTOR

(76) Inventor: Ulrich Stauss, Oberndorfer Str. 13, 78628 Rottweil (DE)

( * ) Notice: Subject to any disclaimer, the term of this patent is extended or adjusted under 35 U.S.C. 154(b) by 0 days.

(21) Appl. No.: 12/064,040

(22) PCT Filed: Jul. 22, 2006

(86) PCT No.: PCT/EP2006/007243

§ 371 (c)(1),
(2), (4) Date: May 29, 2008

(87) PCT Pub. No.: WO2007/019941

PCT Pub. Date: Feb. 22, 2007

(65) Prior Publication Data

US 2008/0232897 A1 Sep. 25, 2008

(30) Foreign Application Priority Data

Aug. 17, 2005 (DE) .................. 20 2005 013 097 U

(51) Int. Cl.
 *F16D 1/00* (2006.01)
(52) U.S. Cl. .................. 403/381; 403/362; 403/387
(58) Field of Classification Search .............. 403/230, 403/362, 381, 387; 411/85, 104
See application file for complete search history.

(56) References Cited

U.S. PATENT DOCUMENTS

| | | | | | |
|---|---|---|---|---|---|
| 2,696,139 | A | * | 12/1954 | Attwood | 411/427 |
| 3,061,055 | A | * | 10/1962 | Nuhuis | 403/7 |
| 3,592,493 | A | * | 7/1971 | Goose | 403/247 |
| 3,612,585 | A | * | 10/1971 | Mayr | 403/264 |
| 3,962,774 | A | * | 6/1976 | Noro | 29/432 |
| 4,100,709 | A | * | 7/1978 | Good | 52/239 |
| 4,101,226 | A | * | 7/1978 | Parisien | 403/4 |
| 4,146,343 | A | * | 3/1979 | Worrallo | 403/264 |
| 4,652,170 | A | * | 3/1987 | Lew | 403/381 |
| 5,171,098 | A | * | 12/1992 | Jost | 403/252 |
| 5,173,001 | A | * | 12/1992 | Schunke | 403/252 |
| 5,192,145 | A | * | 3/1993 | Rixen et al. | 403/255 |

(Continued)

FOREIGN PATENT DOCUMENTS

DE 41 27 284 12/1992

(Continued)

*Primary Examiner*—Daniel P Stodola
*Assistant Examiner*—Nahid Amiri
(74) *Attorney, Agent, or Firm*—Bachman & LaPointe, P.C.

(57) ABSTRACT

In order to arrest a first profile, which has a groove provided with an undercut, a second profile, which has a location opening, whereby preventing these profiles from rotating, there is provided the invention provides a tilting connector in the form of a body extending along a longitudinal extension for fastening in a groove, which is provided with an undercut, of the first profile. This body comprises: a base; a web, which projects from the base, extends along the longitudinal extension and which serves to laterally fasten the tilting connector in the groove, a base area projecting above the web forming a stop surface for interlocking with the undercut; a first hole for an anchor bolt for inserting into a second profile, and; a second hole for a lever bolt. The stop surface has a first stop area and a second stop area, which are situated with an angle ($\beta$) with regard to one another whereby forming a tilting edge between them that is provided for resting and forming a lever projection on a rear side of the undercut.

17 Claims, 5 Drawing Sheets

U.S. PATENT DOCUMENTS

| | | | |
|---|---|---|---|
| 5,729,948 A * | 3/1998 | Levy et al. | 52/656.9 |
| 6,273,635 B1 * | 8/2001 | Swanson | 403/299 |
| 6,478,501 B1 * | 11/2002 | Kahl | 403/255 |
| 6,481,177 B1 * | 11/2002 | Wood | 52/656.9 |
| 6,712,540 B2 * | 3/2004 | Schmalzhofer et al. | 403/248 |
| 6,712,543 B1 * | 3/2004 | Schmalzhofer | 403/381 |
| 7,004,667 B2 * | 2/2006 | Ludwig et al. | 403/258 |

FOREIGN PATENT DOCUMENTS

| | | |
|---|---|---|
| DE | 4131903 | 4/1993 |
| DE | 94 09 015 | 12/1994 |
| DE | 29723896 | 7/1999 |
| EP | 0541918 | 5/1993 |
| FR | 2765949 | 1/1999 |

* cited by examiner

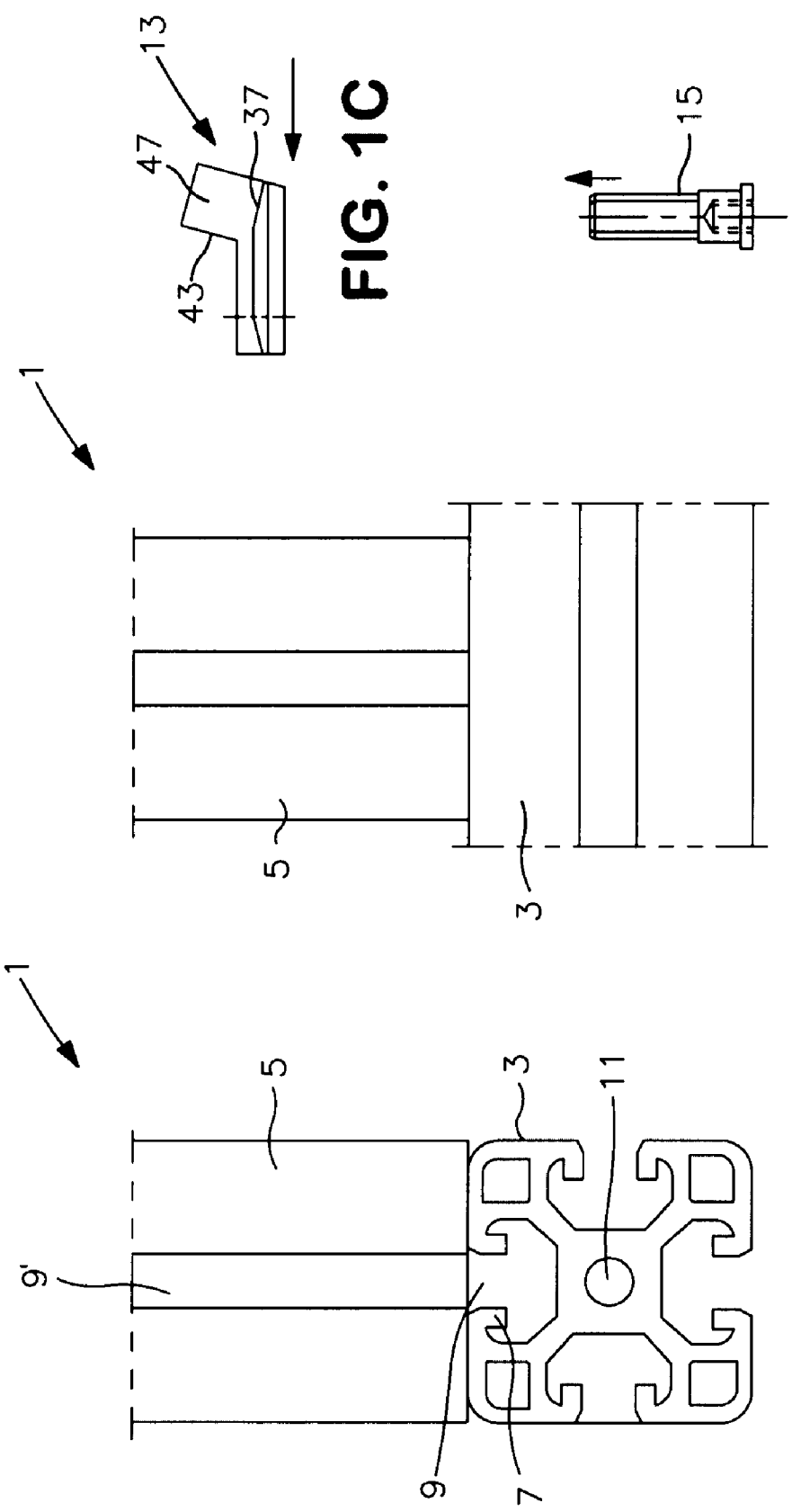

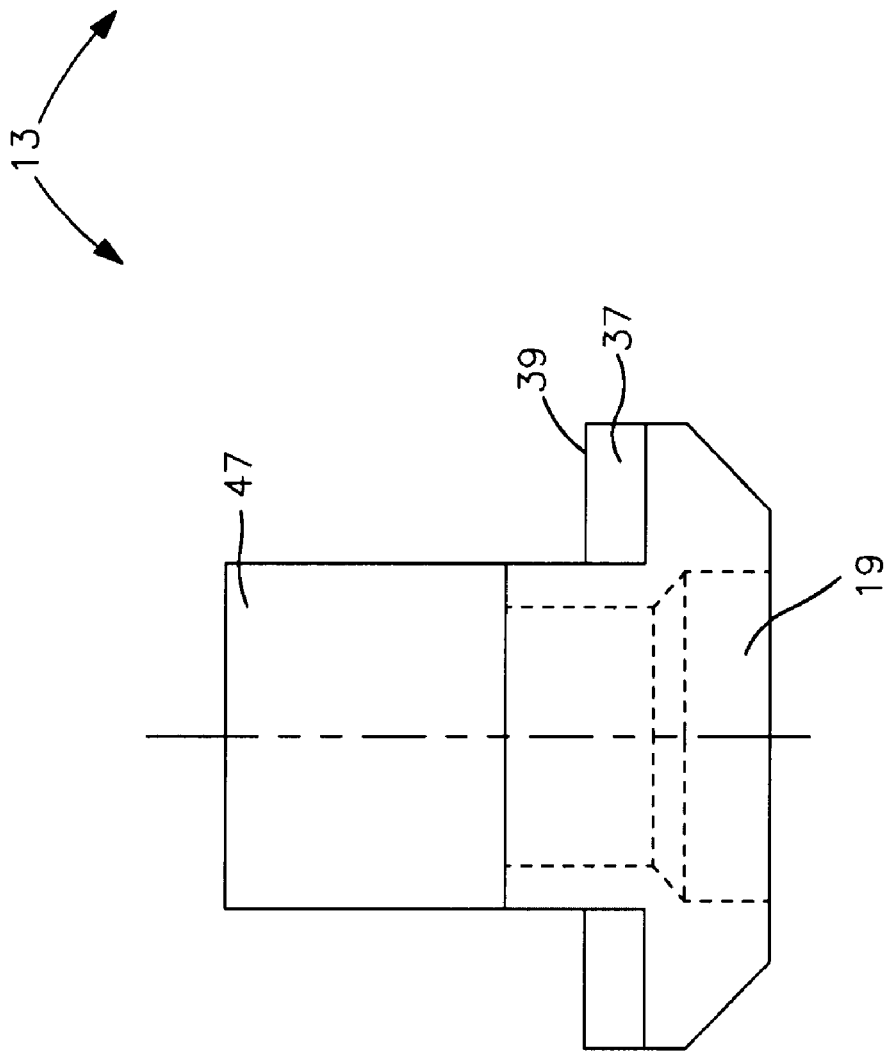

TILTING CONNECTOR

BACKGROUND OF THE INVENTION

The invention relates to a tilting connector for fixing in a groove of a first profile, which groove is provided with an undercut, having: a pedestal and a web which protrudes from the pedestal and extends along the longitudinal extent for laterally fixing the tilting connector in the groove, a pedestal region which projects from the web forming a stop face for engaging behind the undercut, and a first hole for an anchoring screw for insertion into a second profile, and a second hole for a lever screw. The invention also leads to a profile construction.

Similar connectors are known from DE 94 09 015 U1 and DE 41 27 284 C1 for profile constructions which are disclosed there and are made from profile rods. Said profile constructions have at least in each case one longitudinal groove which is provided with at least one undercut, at least part of the profile rods having at least one longitudinal hole which, at least at one of its ends, has a thread which is provided for engagement with an anchoring screw, by means of which a connector which is penetrated by the anchoring screw and has at least one limb can be fixed on the associated first profile rod which engages into the longitudinal groove of the second profile bar to be connected in such a way that it engages behind at least one undercut by way of a limb. The connector can be fixed on the first profile rod with predefinable play and engages into the longitudinal groove of the second profile rod with at least partial compensation for said play.

The connector which is disclosed there is not a tilting connector, however. Rather, the connector which is disclosed in DE 41 27 284 C1 has a hole which reaches through it completely and has an internal thread, in which a second screw is received which is supported by way of its one end against the first screw in such a way that the connector is pressed with at least one limb against a web part of an undercut in such a way that the profile rods are connected fixedly to one another via the connector as a result. Said connector therefore imparts a pressing pressure which the second screw exerts on the head of the anchoring screw.

This prior art concept could still be improved.

It is disadvantageous here, above all, that the use of a headed screw is necessary as anchoring screw, since the second screw is supported on the head of the anchoring screw, in order to impart the pressing pressure via the connector. This in turns requires the headed screw to protrude with its head beyond the pedestal of the connector, which represents an additional space requirement. Said concept cannot therefore be used for grooves which are as flat as desired; rather, the screw combinations which are used have to be adapted in each case to a groove depth. This has the consequence that there is a certain obligation to use standard profiles in any case.

Since profile parts of the explained type are often used under time pressure and ensuring flexible possible applications with regard to different sizes and construction types, for example in fair stands and similar constructions, it is desirable for it to be possible to use connecting elements which are as flexible as possible and can be used versatilely, independently of the type of profiles which are used. At the same time, assembly should nevertheless be carried out simply, quickly and in a manner which is secured against rotation.

The invention proceeds from this point, the object of said invention being to specify a connector which can be locked particularly flexibly, easily and at the same time such that it cannot rotate, and which connector can also be inserted, in particular, into flat grooves of a profile. It is also an object of the invention to specify a corresponding profile construction. The invention also provides a method for connecting a first profile to a second profile, which method achieves the formulated object.

SUMMARY OF THE INVENTION

The object with regard to the connector is solved by a tilting connector which is mentioned in the introduction and in which there is provision according to the invention for
the stop face to have a first stop region and a second stop region which are arranged at a releasing angle with respect to one another and, as a result, form a tilting edge which lies between them and is provided for contact and formation of a lever attachment on a rear side of the undercut.

The invention also leads to a profile construction having a first profile with a groove which is provided with an undercut, and having a second profile with a receiving opening, and having a tilting connector of the above-mentioned type.

The object with regard to the method is achieved by the invention by way of a method for connecting a first profile with a groove which is provided with an undercut and a second profile with a receiving opening, in which method a tilting connector according to the above-mentioned inventive concept is used, and in which method
the anchoring screw is arranged in the first hole of the tilting connector,
the tilting connector is fixed with the web laterally in the groove,
the anchoring screw is inserted into the receiving opening of the second profile,
the lever screw is arranged in the second hole of the tilting connector,
the lever screw abuts the groove bottom of the first profile in such a way that
the tilting edge bears against a rear side of the undercut and forms a lever attachment there,
the tilting connector being tilted when the lever screw is inserted further, via a lever which is formed between the lever attachment and the contact point of the lever screw on the groove bottom, and the second profile being pulled to the first profile via the anchoring screw.

In contrast to the prior art which is mentioned in the introduction, the inventive concept provides the connection of two profiles via a tensile stress which, according to the findings of the invention, is imparted via the tilting connector via an amplifying lever function. To this end, the tilting connector provides a stop face which has a first stop region and a second stop region which are arranged at a releasing angle with respect to one another. In other words, the second stop region is tilted away from an imaginary continuous extrapolation of the first stop face. As a result, a tilting edge is formed between the first stop region and the second stop region. During fixing of the tilting connector, the tilting edge bears against a rear side of the undercut of the first profile and forms the lever attachment of the lever as a result.

If a lever screw is then arranged in the second hole of the tilting connector and abuts the groove bottom of the first profile, the lever which is formed between the lever attachment and the stop point leads to tilting of the tilting connector about the tilting edge if the lever screw is inserted further.

That region of the tilting connector which lies on the other side of the tilting edge is therefore moved away from the rear side of the undercut of the first profile part by way of the anchoring screw which is inserted in the first hole, and thereby pulls the second profile to the first profile.

In contrast to the prior art, the inventive concept therefore first of all realizes space advantages in the groove of the first profile, since the anchoring screw can advantageously be countersunk in the first hole and, in contrast to the prior art, no longer has to make its head available as a tensile pressure point. Rather, the inventive concept then provides substantially simpler handling which additionally leads to secure locking of the first profile on the second profile as a result of lever action. That is to say, the anchoring screw and the lever screw advantageously no longer have to have their screwed in lengths adapted to one another, since said screws act independently of one another. The lever arm is produced without adjustment problems between the projection of the lever screw on the groove bottom and the lever attachment on the rear side of the undercut with contact of the tilting edge.

The tilting connector of the inventive concept explained can therefore be used flexibly and at the same time reliably with every type of profile and with a very wide variety of screws. Mounting the profiles by way of the tilting connector according to the inventive concept proves particularly easy, flexible and quick. This ultimately leads to a cost saving, since both accessories and work expenditure can be saved. Flexibility, such as is achieved with the inventive concept presented, is usually possible only with additional machine use and time-intensive drilling and milling work. In the present case, the above-mentioned tilting connector with practically any desired type of anchoring screw or lever screw and a screwdriver is sufficient for this purpose.

Advantageous developments of the invention are to be gathered from the subclaims and specify in detail advantageous possibilities to develop the proposed tilting connector with regard to simple handling and higher tensile strength within the context of the object set and with regard to further advantages.

There is preferably provision in the case of the tilting connector for the pedestal region to project from the web with a width which is identical on both sides. This leads to uniform load distribution along the transverse extent of the tilting connector.

The releasing angle is preferably an angle above 135°, that is to say an angle between 135° and 180°. In other words, the angle which is measured with respect to the horizontal is preferably an acute angle. In particular, the releasing angle is an angle between 160° and 170°, in particular an angle of 165°. It has been shown namely that, if the second stop region is tilted with respect to the horizontal by approximately 15°, a sufficient amplitude can be realized for almost all profile parts, in order to ensure reliable locking of a first profile and a second profile.

There is provision in one particularly preferred development of the invention for the first hole for receiving the anchoring screw to be a countersunk hole which is arranged in the web and has a projection in the region of the first stop region, and for said first hole to have an axis which is oriented substantially perpendicularly with respect to the first stop region. The anchoring screw is therefore in practice guided through substantially perpendicularly with respect to the tilting connector. The second profile can be connected particularly satisfactorily in this way.

In particular, it is preferred that the first hole has an oversized diameter for receiving the armature screw with lateral play. This leads to a situation where, if the tilting connector and therefore also the anchoring screw tilt, jamming of said anchoring screw in the tilting connector is avoided. For example, oblique positions of the anchoring screw relative to the tilting connector of up to 10° from the 90° angle can be realized in this way.

There is provision in another particularly preferred embodiment for the second hole for receiving the lever screw to be a threaded hole which is arranged in the web in the region of the second stop region, and for said second hole to have an axis which is oriented substantially perpendicularly with respect to the second stop region. This has the advantage that the head face of the lever screw is inclined with respect to the horizontal in practice like the second stop region. In this way, a screwdriver can be applied obliquely in a particularly advantageous manner and the lever screw can be pulled particularly easily against the groove bottom of the first profile.

As has already been explained, the lever arm is expediently formed between the lever attachment and the stop of the lever screw on a groove bottom of the first profile.

A web surface advantageously extends parallel to the first stop region.

In a first variant of the last mentioned development, there is provision in the tilting connector for a web surface to extend virtually along the entire longitudinal extent parallel to the first stop region. In this case, the lever screw which protrudes beyond the web surface advantageously acts as an antirotation lock. To this end, the lever screw expediently has a head or a thread, the transverse extent of which is smaller than the transverse extent of a groove of the upright second profile.

In a second variant of the above-mentioned development, there is provision for a dome for accommodating the second hole to protrude from the web in the region of the second stop region. In other words, in this case the tilting connector is formed, as viewed from the side, in the form of a shaped angled part, the first limb of which is formed by the pedestal having a protruding web and the second limb of which is formed by the protruding dome.

Here, the dome expediently has a transverse extent which does not exceed the transverse extent of the web, and is preferably equal to the transverse extent of the web. In this way, it is ensured that the dome fits into the groove of the upright second profile and therefore serves as antirotation safeguard for the upright second profile. To this extent, the second variant of the development which is explained here is more advantageous than the first variant, since an antirotation safeguard of the upright second profile via the dome is already realized without a lever screw.

The dome preferably has an axis which lies substantially perpendicularly on the second stop region. In principle, the dome axis could also have a different angle, but it has been shown that, as already explained in the above text, screwing in of the lever screw is made particularly easy if it is guided obliquely into the tilting connector. The dome preferably has a dome surface which extends substantially parallel to the second stop region—it therefore forms an acute angle with respect to the horizontal, in a similar manner to the second stop region.

The projecting pedestal region advantageously has a further angled-away region. It has been shown that a flattened portion of the tilting connector in the front region makes it substantially easier to insert said tilting connector into a groove of the first profile.

Exemplary embodiments of the invention will now be described in the following text using the drawing. The latter is not necessarily intended to illustrate the exemplary embodiments to scale; rather, the drawing is of diagrammatic and/or slightly distorted configuration, where this serves for explanation purposes. With regard to additions of the direct teachings from the drawing, reference is made to the relevant prior art. It is to be taken into consideration here that a wide variety of modifications and changes relating to the form and the detail of an embodiment can be carried out without deviating from the general concept of the invention. The features of the invention which are disclosed in the description, in the drawing and in the claims can be essential both individually and also in any desired combination to the embodiment of the invention. In particular, all numerical values which occur in a disclosed numerical range are considered to be disclosed by way of the numerical range and can serve to develop the invention individually and in any desired combination and a very wide variety of ranges, and can be claimed individually. The general concept of the invention is not restricted to the exact form or the detail of the preferred embodiment which is shown and described in the following text, nor is it restricted to a subject matter which would be restricted in comparison with the subject matter which is claimed in the Claims.

BRIEF DESCRIPTION OF THE DRAWINGS

In the figures of the drawing, in detail:

FIG. 1 shows a profile construction of a first profile and a second profile having a tilting connector in a side view (A) and an extrapolated view (B) according to one particularly preferred embodiment;

FIG. 6 shows an end-side view of a tilting connector from FIGS. 1 to 5 as a functional drawing (A) and with dimensioning (B) for a groove 10 connection.

DETAILED DESCRIPTION

Figures 2A, 2B:
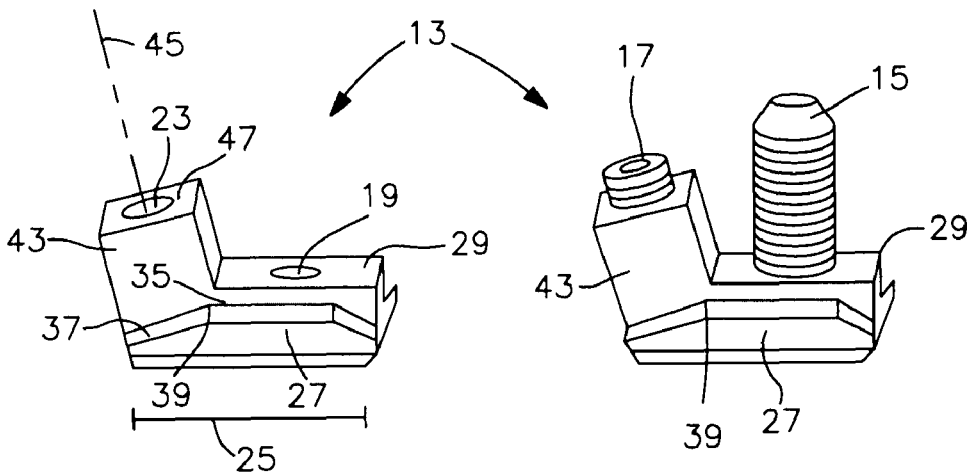
FIG. 2 shows a perspective illustration of one particularly preferred embodiment of a tilting connector without (A) and with (B) an inserted lever and anchoring screw in a lateral perspective view.

FIG. 1 shows a profile construction 1 having a first profile 3 and a second profile 5 which stands perpendicularly on the first profile 3. Here, view (A) shows the first profile 3 in cross section. It has a groove 9 which is provided with an undercut 7 on the seating side for the second profile 5. Furthermore, the second profile 5 has a receiving opening 11 which is arranged centrally in the central region, in a similar manner to the first profile 3.

As can be seen in the extrapolated view (B) of FIG. 1, that groove 9 of the first profile 3 which is provided with the undercut 7 serves to receive the tilting connector which is to be inserted laterally. The latter is penetrated from below by an anchoring screw 15 which is provided for insertion into the receiving opening 11 of the upright second profile 5. In this state, the tilting connector lies with the anchoring screw 15 with play in that groove 9 of the first profile which is provided with the undercut 7.

Figures 3A, 3B:
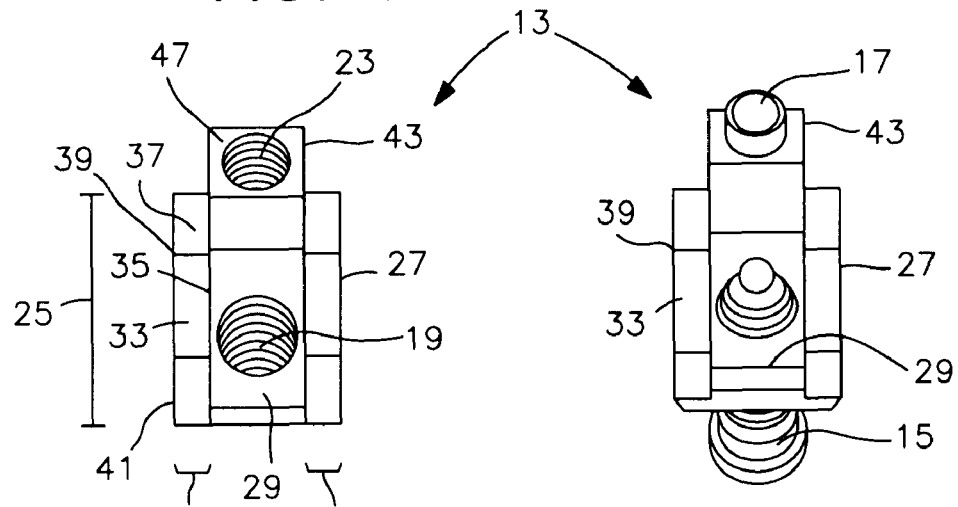
FIG. 3 shows the tilting connector which is shown in FIG. 2 without (A) and with (B) an inserted lever and anchoring screw in a perspective plan view.
Figures 4A, 4B:
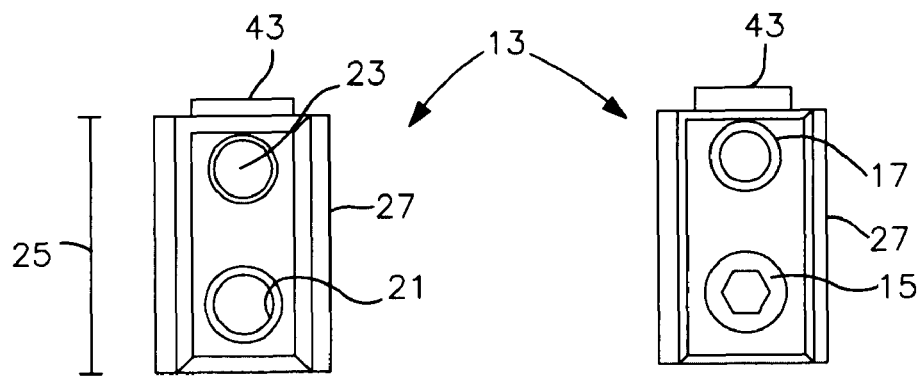
FIG. 4 shows the tilting connector which is shown in FIG. 2 and FIG. 3 without (A) and with (B) an inserted lever and anchoring screw in a perspective view from below.

FIGS. 2, 3 and 4 show the tilting connector 13 in each case in views (A) and (B) without and with a lever screw 17 or anchoring screw 15. In order to receive the anchoring screw 15, the tilting connector 13 has a first hole 19 which is formed as a countersunk hole 19 with a projection 21 in order to receive the anchoring screw 15. Furthermore, the tilting connector 13 has a second hole 23 which is configured as a threaded hole in order to receive the lever screw 17. The tilting connector 13 itself is formed in the form of a body which is stretched along a longitudinal extent. Said body has a pedestal 27 and a web 29 which protrudes from the pedestal 27 and extends along the longitudinal extent 25. The web serves for laterally fixing the tilting connector 13 in the groove 9 of the first profile. Furthermore, the tilting connector 13 has a pedestal region 31 which projects from the web 29 with a width which is identical on both sides. The pedestal region 31 forms a stop face 33 for engaging behind the undercut 7 of the first profile 3. According to the concept of the invention, the stop face 33 has a first stop region 35 and a second stop region 37 which are arranged with respect to one another at a releasing angle which is explained in greater detail in FIG. 5 and, as a result, form a tilting edge 39 which lies between them and is provided for contact and forming a lever attachment on a rear side of the undercut 7. In the particularly preferred embodiment which is shown here, the projecting pedestal region 31 also has a further angled-away region 41 which serves for an improved ability to insert the tilting connector 13 into those regions of the groove 9 of the first profile which lie under the undercut 7.

Furthermore, FIGS. 1 to 4 show that a dome 43 for accommodating the second hole 23 protrudes from the web 29 in the region of the second stop region 37. Said dome 43 has an axis 45 which lies substantially perpendicularly on the second stop region 37. In particular, the dome surface 47 extends substantially parallel to the second stop region 37.

Figure 5:
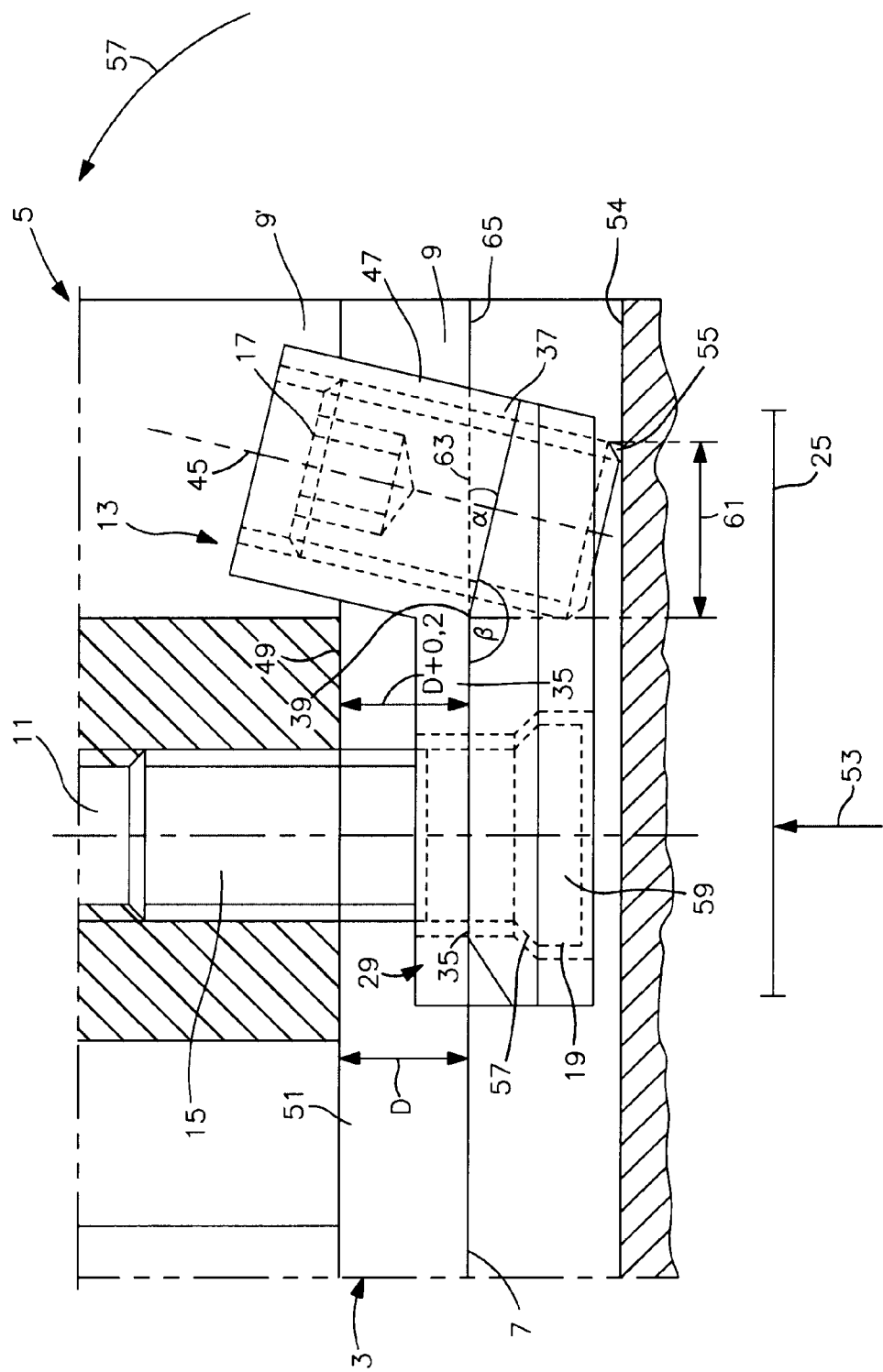
FIG. 5 shows a functional drawing of a tilting connector according to one particularly preferred embodiment in a profile construction having a first and second profile, as explained in relation to FIG. 1.

As shown in FIG. 5, the tilting connector 13 is fixed with an anchoring screw 15 in the receiving opening 11 which is configured as a central core hole of the second profile 5 which is to be fixed, in such a way that the tilting connector 13 can be pushed easily into the groove 9 of the first profile 3. Here, the anchoring screw 15 is screwed into the receiving opening 11 only to such an extent that preferably a play of at least 0.2 mm still remains. The spacing between the first stop region 35 and the upper outer face 49 of the first profile 3 therefore substantially corresponds to the thickness D of the upper wing 51 of the first profile 3 plus 0.2 mm.

If the profile connection is then moved to a desired position 53 by displacement of the tilting connector 13 together with the upright second profile 5, a support 55 and at the same time a tilting movement 57 of the tilting connector 13 around the tilting edge 39 is achieved by way of the lever arm 61 which exists as a result of the distance between the tilting edge 39 and the support 55, by screwing in the obliquely positioned lever screw 17 on the groove bottom 54 of the first profile 3. As a result of the tilting movement 57, the tilting connector 13 moves, at its point 58 which lies on the other side of the tilting edge 39 in the region of the first stop region 35, toward the anchoring screw 15 which is seated first of all with play in the first hole 19, which is configured as a countersunk hole, and has a countersunk screw head 59, and, having reached the screw head 59, pulls the second profile 5 onto the first profile 3 via said screw head 59.

In order to achieve as secure a tilting movement 57 as possible, the countersunk hole 19 in the embodiment which is shown in FIG. 5 is of such large configuration that the anchoring screw 15 does not jam in the countersunk hole 19 even in the case of an oblique position of the countersunk hole 19. As has already been explained using FIGS. 1 to 4, a second stop region 37 of the tilting connector 13 is released from the tilting edge 39 at an acute angle, in the present case at an angle α of 15°, that is to say is inclined with respect to the horizontal 63. In other words, the releasing angle β is an angle of 165° in the present case. In contrast to the prior art, where a stop face is oriented completely only along the horizontal 63, a stop face is provided, according to the concept of the invention in the present embodiment, with a first stop region 35 and a second stop region 37 which, in order to form the tilting edge 39, are arranged at a releasing angle β with respect to one another, in order to make a tilting movement 57 of the tilting connector 13 possible around the tilting edge 39.

In the present embodiment, a dome 43 which acts as antirotation lock for the second profile 5 is situated at approximately the same angle, since said dome 43 penetrates the groove 9 of the first profile 3 and engages into the groove 9' of the second profile 5. In principle, the dome 43 could also be oriented at right angles with respect to the pedestal region 31 or with respect to the first stop region 35. However, it has proven advantageous that the dome 43 has an axis 45 which stands substantially perpendicularly on the second stop region 37.

In a variant (not shown here) to the embodiment which is shown in the present figures, a surface of a web 29 can also extend virtually along the entire longitudinal extent 25 of the tilting connector 13; in other words, the surface of the web 29 could also be retained in this variant over the entire longitudinal extent 25 of the tilting connector 13. In this case, the dome 43 which acts as antirotation lock would be omitted. In this variant, the lever screw 17 would then act as antirotation lock. An effect of this type can be reinforced, in particular, by the fact that the lever screw 17 is configured as a relatively long screw which optionally has a thread diameter which corresponds approximately to the width of the groove 9' or the lever screw 17 can have a correspondingly shaped screw head which corresponds approximately to the width of the groove 9'.

After the profile construction is arranged as shown in FIG. 5, the lever screw 17 abuts the groove bottom 54 of the first profile 3. As a rule, it penetrates the anodized layer at the support 55 which defines the stop point, after tightening, and produces conductivity and security against slipping in this way. The tilting edge 39 then bears against the rear side 65 of the undercut 7 and forms the lever attachment there for forming the lever arm 61 between the lever attachment 39 and the support 55. If the lever screw 17 is inserted further, the tilting connector 13 is tilted until the anchoring screw 15 has pulled the second profile 5 against the first profile to a sufficient extent. A sufficient tensile stress is preferably achieved in addition.

In this way, locking of the second profile 5 to the first profile 3 is achieved which is particularly secure and at the same time simple to handle and flexible. That groove of the second profile 5 which lies opposite the groove 9' can be fitted with surface elements in the profile construction which is shown here, on account of the tilting connector which does not appear on the opposite side.

FIG. 6 shows the tilting connector from FIG. 5 in an endside view (A). In view (B), the same tilting connector 13 is shown to scale as an advantageous embodiment for a groove 10 connection.

Figure 7A:
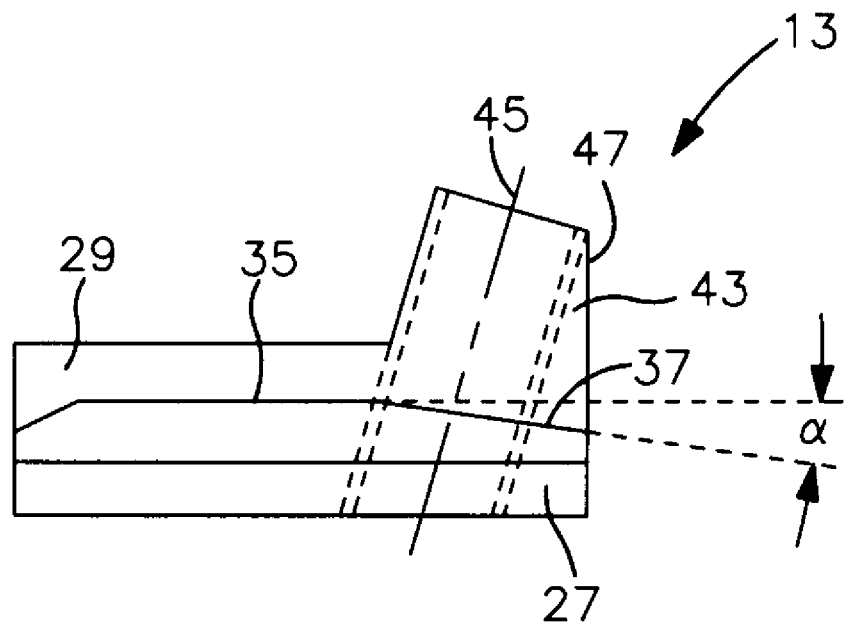
FIG. 7 shows a side view (A) and a plan view (B) of a tilting connector from FIG. 6 having dimensioning for a groove 10 connection.
Figure 7B:
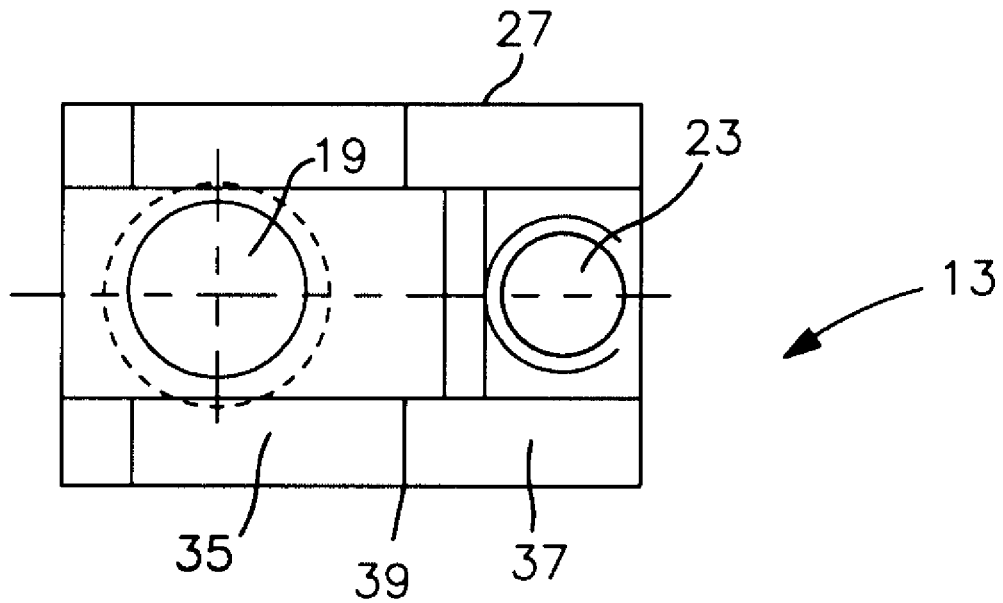

FIG. 7 shows the tilting connector from view FIG. 6 (B) as a side view (A) and as a plan view (B) to scale for a groove 10 connection. Corresponding designations are used as in the previous figures.

In order to lock a first profile 3 having a groove 9 which is provided with an undercut 7 and a second profile 5 having a receiving opening 11 such that they cannot rotate, the invention provides a tilting connector 13 for fixing in a groove 9, which is provided with an undercut 7, of the first profile 3 in the form of a body which is stretched along a longitudinal extent 25 and has the following: a pedestal 27 and a web 29 which protrudes from the pedestal 27 and extends along the longitudinal extent 25 for laterally fixing the tilting connector 13 in the groove 9, a pedestal region 31 which projects from the web 29 forming a stop face 33 for engaging behind the undercut 7, and a first hole 19 for an anchoring screw 15 for inserting into a second profile 5, and a second hole 23 for a lever screw 17. Here, there is provision according to the invention for the stop face 33 to have a first stop region 35 and a second stop region 37 which are arranged at a releasing angle β with respect to one another and, as a result, form a tilting edge 39 which lies between them and is provided for contact and forming a lever attachment on a rear side of the undercut 7.

The invention claimed is:

1. A tilting connector (13) for fixing in a groove (9) of a first profile (3), which groove (9) is provided with an undercut (7), comprising:
   (1) a pedestal (27) and a web (29) which protrudes from the pedestal (27) for laterally fixing the tilting connector (13) in a groove (9) of a first profile,
   (2) a region (31) of the pedestal, which region projects from the web (29) forming a stop face (33) for engaging behind an undercut (7) provided in the groove; and
   (3) a first hole (19) for an anchoring screw (15) for insertion into a second profile (5), and a second hole (23) for a lever screw (17); wherein the stop face (33) has a first stop region (35) and a second stop region (37) which are arranged at a releasing angle (β) with respect to one another and form a tilting edge (39) which lies between the first stop region (35) and the second stop region (37) and between the first hole (19) and the second hole (23), and wherein the tilting edge (39) is provided for contact and formation of a lever attachment on a rear side of the undercut (7).

2. The tilting connector as claimed in claim 1, having a body stretched along a longitudinal extent (25), the web (29) extending along the longitudinal extent (25).

3. The tilting connector as claimed in claim 2, wherein a web surface extends parallel to the first stop region (35).

4. The tilting connector as claimed in claim 3, wherein a web surface extends along the longitudinal extent (25) parallel to the first stop region (35).

5. The tilting connector as claimed in claim 3, wherein a dome (43) for accommodating the second hole (23) protrudes from the web (29) in the region of the second stop region (37).

6. The tilting connector as claimed in claim 5, wherein the dome (43) has a transverse extent which does not exceed the transverse extent of the web (29).

7. The tilting connector as claimed in claim 5, wherein the dome (43) has an axis (45) which lies substantially perpendicularly on the second stop region (37).

8. The tilting connector as claimed in claim 5, wherein the dome (43) has a dome surface (47) which extends substantially parallel to the second stop region (37).

9. The tilting connector as claimed in claim 1, wherein the region (31) projects from the web with a width which is identical on both sides.

10. The tilting connector as claimed in claim 1, wherein the releasing angle (β) is an angle above 135°.

11. The tilting connector as claimed in claim 1, wherein the releasing angle (β) is an angle between 160° and 170°.

12. The tilting connector as claimed in claim 1, wherein the releasing angle (β) is an angle of 165°.

13. The tilting connector as claimed in claim 1, wherein the first hole (19) for receiving the anchoring screw (15) is a countersunk hole which is arranged in the web (29) and has a projection (21) in the region of the first stop region (35), and said first hole (19) has an axis which is oriented substantially perpendicularly with respect to the first stop region (35).

14. The tilting connector as claimed in claim 1, wherein the first hole (19) has an oversized diameter for receiving the anchoring screw (15) with lateral play.

15. The tilting connector as claimed in claim 1, wherein the second hole (23) for receiving the lever screw (17) is a threaded hole which is arranged in the web (29) in the region of the second stop region (37), and said second hole (23) has an axis (45) which is oriented substantially perpendicularly with respect to the second stop region (37).

16. The tilting connector as claimed in claim 1, wherein a lever arm (61) which is formed between the lever attachment and a support (55) of the lever screw (17) on a groove bottom (54) of the first profile (3).

17. The tilting connector as claimed in claim 1, wherein the projecting pedestal region (31) has a further angled-away region (41).

* * * * *